F. J. MILLER.
POWER HACKSAW.
APPLICATION FILED JUNE 21, 1917.
1,264,202.
Patented Apr. 30, 1918.
3 SHEETS—SHEET 1.
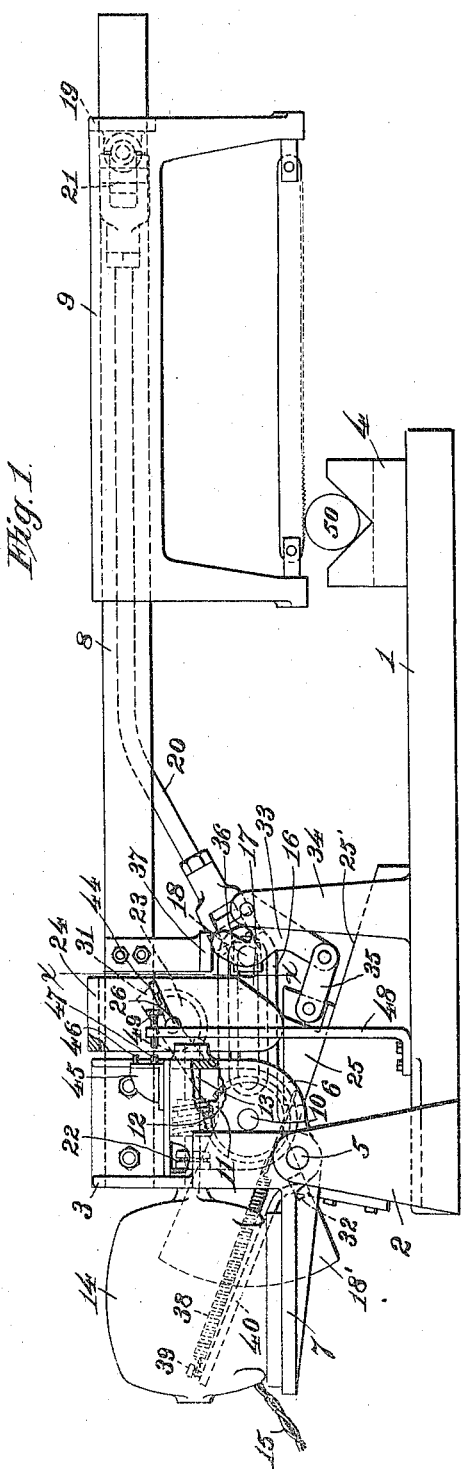
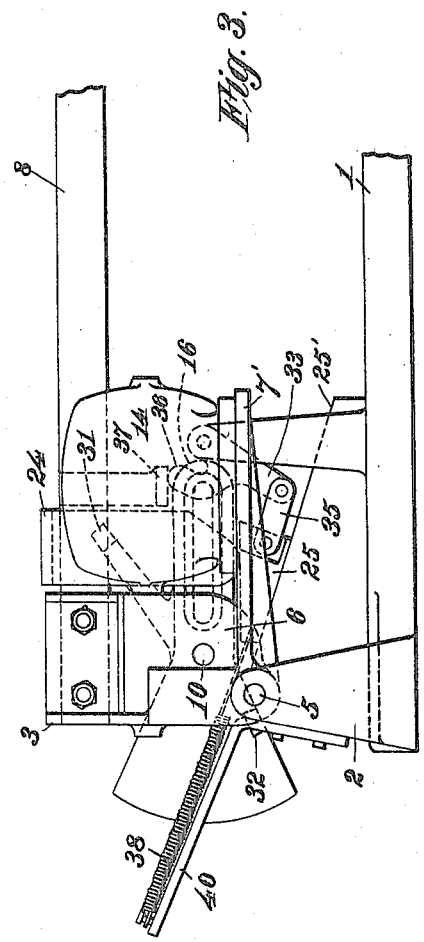
Inventor
Frank J. Miller
By Joshua R H Potts
Attorney

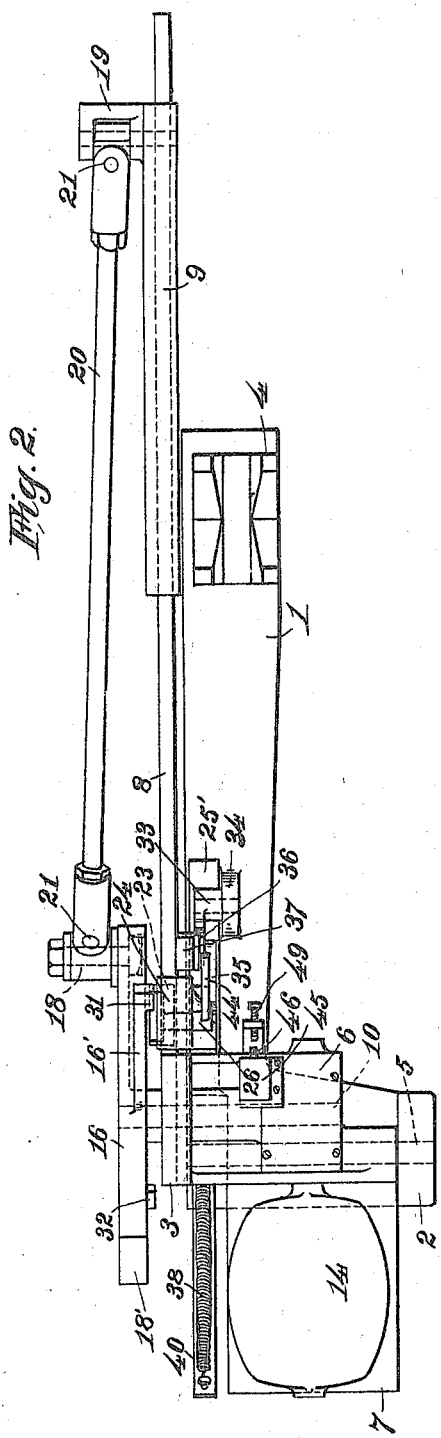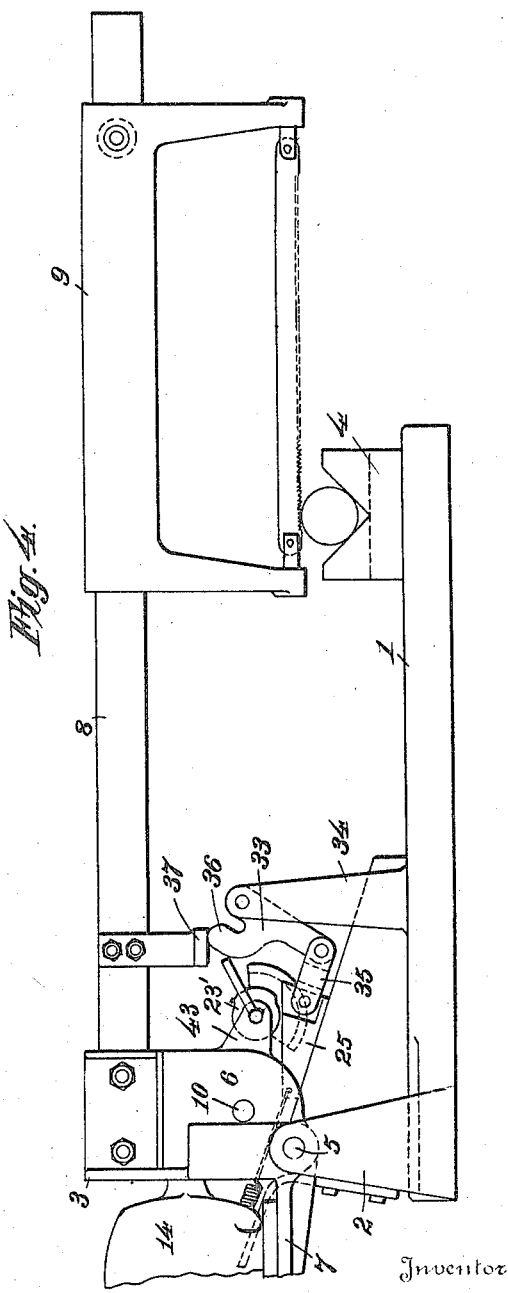

F. J. MILLER.
POWER HACKSAW.
APPLICATION FILED JUNE 21, 1917.
1,264,202.
Patented Apr. 30, 1918.
3 SHEETS—SHEET 3.
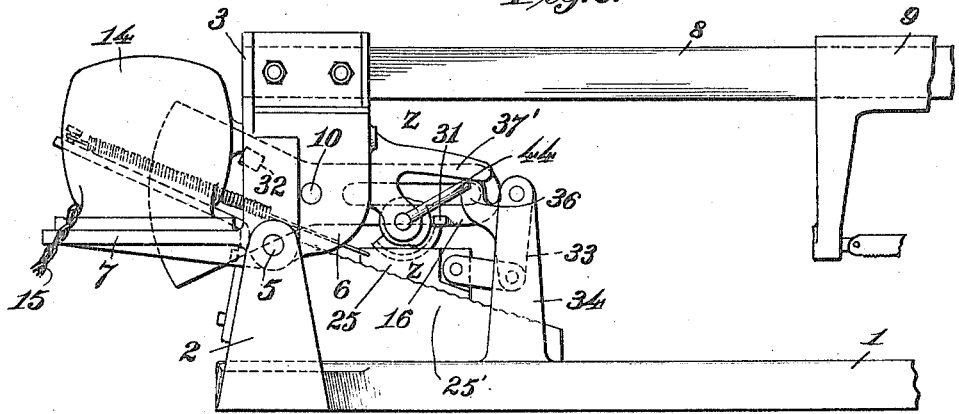
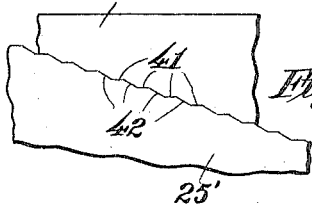
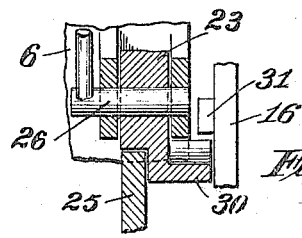
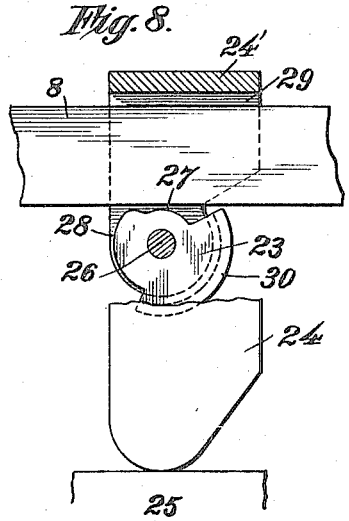
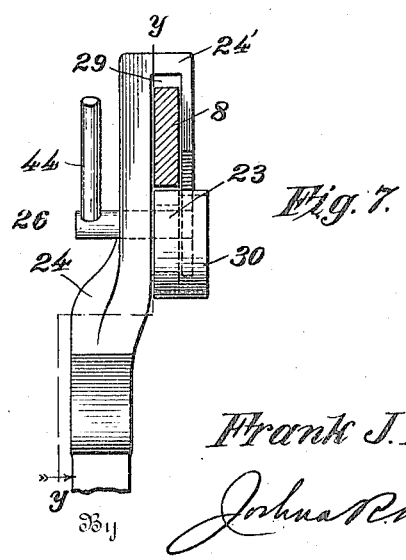
Inventor
Frank J. Miller
By Joshua R. H. Potts
Attorney

UNITED STATES PATENT OFFICE.

FRANK J. MILLER, OF WILLIAMSPORT, PENNSYLVANIA.

POWER-HACKSAW.

1,264,202. Specification of Letters Patent. Patented Apr. 30, 1918.

Application filed June 21, 1917. Serial No. 176,057.

*To all whom it may concern:*

Be it known that I, FRANK J. MILLER, a citizen of the United States, residing at Williamsport, county of Lycoming, and State of Pennsylvania, have invented certain new and useful Improvements in Power-Hacksaws, of which the following is a specification.

My invention relates to metal working tools and especially to hack saws. More particularly my invention relates to power driven hack saws.

The object of my invention is to provide in a power hack saw, means for producing a powerful working stroke and for raising the saw on the return stroke. A further object of my invention is to provide, in a power hack saw equipped with means for raising the saw on the return stroke, automatic feed mechanism, that is means for feeding the saw to the work with each cutting stroke. A further object of my invention is to provide in a power hack saw as mentioned, means for automatically stopping the operation of the device when the saw reaches a pre-determined position with relation to the work. A further object of my invention is to provide, in a device of the class mentioned, means automatically operable to maintain the saw in raised position after having been manually raised. A further object of my invention is to provide a device of the class mentioned wherein the length of the operative stroke of the saw may be regulated. A further object of my invention is to provide a power hack saw as mentioned which shall give a true cutting stroke, that is, one in which there shall be no lateral strain upon the saw. Other objects will appear hereinafter.

With these objects in view, my invention consists generally in a suitable base, a frame pivotally mounted on said base and a saw mounted for reciprocation on said frame, means for reciprocating said saw and means for raising the saw upon each return stroke thereof. My invention further consists in a device as above mentioned in which the saw raising means comprises a cam, and coöperating means on the base member, together with means for operating the cam at each end of the stroke. My invention further consists in a power hack saw as above mentioned in which a thrust member is provided on the base to receive the thrust of the cam and means for raising and lowering said thrust member to provide proper feeding for the saw to the work. My invention further consists in a device as mentioned equipped with means for automatically operating the cam to hold the saw in raised position after the saw has been manually raised.

My invention further consists in a power hack saw comprising a base, a frame pivotally mounted on said base and equipped with a saw mounted for reciprocation thereon and means for reciprocating the saw, in combination with feeding mechanism comprising an incline on said base, a wedge shaped thrust member on said incline, a cam interposed between said frame and said thrust member and means for moving said thrust member on said incline. My invention further consists in a power hack saw as above mentioned further characterized by forming the coöperating surfaces of the incline and thrust member with a plurality of faces in stepped relation and substantially perpendicular to the thrust of the cam and connected by inclined faces facilitating the movement of the thrust member with relation to the incline.

My invention further consists in a power hack saw comprising a base, a pivotally mounted frame thereon equipped with a reciprocating saw, means for actuating the same including a motor carried by said frame, in combination with means for stopping said motor when the saw has reached a pre-determined position. My invention further consists in a device as mentioned further characterized by means for adjusting the motor stopping device. My invention further consists in a power hack saw as above stated in which a switch is mounted on said frame for starting and stopping the motor and a member mounted on said base adapted to engage said switch when the saw reaches a pre-determined position to throw the switch to stop the motor.

My invention further consists in a power hack saw comprising a base, a frame pivotally mounted thereon and equipped with a reciprocating saw and means for actuating the same, said means including a motor driven crank and a pitman connecting said crank, a saw, and means for adjusting the distance between the axis of said crank and the connection between the saw and the pitman whereby the stroke of the saw may be regulated. My invention further consists in a device as mentioned further characterized by providing universal joints at the ends of the pitman whereby lateral strain on the saw is obviated. My invention further consists in a device as mentioned in which the cam actuating device is carried by said crank.

My invention further consists in various details of construction and arrangements of parts all as will be fully described hereinafter, and particularly pointed out in the claims:

My invention will be more readily understood by reference to the accompanying drawings forming a part of this specification, and in which:

Figure 1 is a side elevation of a power hack saw embodying my invention, portions being broken away to disclose features of construction, Fig. 2 is a top plan view of the same, Fig. 3 is a detail side elevation of a modified form of the device, Figs. 4 and 5 are side elevations of further modifications, Fig. 6 is a detail view, upon an enlarged scale, illustrating the step construction of the coöperating faces of the incline and superimposed thrust member, Fig. 7 is a detail cross section on substantially the line $x$—$x$ of Fig. 1, illustrated upon an enlarged scale, Fig. 8 is a sectional view taken on substantially the line $y$—$y$ of Fig. 7, and Fig. 9 is a detail cross section on substantially the line $z$—$z$ of Fig. 5.

Referring now to the drawings, 1 indicates the base which is provided with brackets 2, upon which a pivoted frame 3 is mounted, and also with a work support 4. The frame 3 is pivoted upon trunnions 5, and comprises a gear housing 6, motor support 7, and a slide-bar 8 upon which the saw 9 is mounted for reciprocation. Arranged within the housing 6, upon a transverse crank shaft 10, is a worm gear 11 meshing with a worm 12 on a longitudinally disposed motor shaft 13. 14 indicates the motor supported upon the member 7 and to which current is supplied through a flexible cable 15. In Figs. 1, 2, 4, and 5 of the drawings I have illustrated the motor support 7 arranged on the end of the frame 3 opposite from the saw 9, but it is obvious that this support may be arranged upon the same side as the saw and in Fig. 3 I have so illustrated the same, 7' indicating the support.

Mounted upon the shaft 10 is a crank arm 16 provided with a counterbalance 18'. The crank arm 16 is longitudinally slotted as at 17 to receive and adjustably support thereon a wrist-pin 18. The saw frame 9 is provided with a bracket 19 and a pitman 20 connects the wrist-pin 18 and said bracket. The crank is spaced laterally from the slide-bar 8, and the wrist-pin is arranged upon the outside of the crank in order to avoid interfering with the cam, hereinafter described. The pitman is therefore disposed at an angle to the slide-bar, and to avoid lateral strain on the saw due to this arrangement, universal joints 21 are provided between the ends of the pitman and the wrist-pin and bracket.

It is obvious that upon actuation of the motor the saw will be reciprocated on the slide-bar 8 through the medium of the crank 16 and pitman 20, and that by reason of the worm gearing above described the stroke of the saw will be slow but powerful. 22 indicates ball bearing thrust members to relieve the motor and motor shaft of the longitudinal thrust due to the operative stroke of the saw.

One of the objects of my invention is to provide means for elevating the saw upon the return stroke, and to this end I provide a cam 23 interposed between the frame 3 and the base, and equip the device with means for automatically actuating the cam to raise the frame at the end of the work stroke and to maintain the same in raised position during the return stroke, and with means for tripping the cam to lower the frame at the beginning of the operative stroke. As shown in Figs. 1 and 2 I provide a member 24 arranged astride the pivotal frame 3 and having its lower end resting upon a thrust member 25 which supports said member. The cam 23 is mounted on a shaft 26 arranged transversely of the member 24, and is formed with two peripheral operative faces 27 and 28 respectively. When the cam is in the position shown in full lines in Fig. 8 the frame is lowered and maintains this position throughout the operative stroke of the saw. When the cam is thrown into position with the portion 28 engaging the bar 8, the frame is raised and is held in this position during the return stroke, after which the cam is again dropped into the position shown in full lines. It should be noted that when the frame is lowered there is a slight space between the arm 8 and the cam face 27 which permits further lowering of the frame due to the cut of the saw. There is also sufficient space, as at 29 between the upper edge of bar 8 and the transverse portion 24' of the member 24 to permit raising of the frame when the portion 28 of the cam engages the under edge of the slide-bar 8. To actuate the cam I provide the same with a laterally disposed boss or flange 30 and equip the crank with a pair of lugs 31 and 32 respectively, diametrically disposed to each other and which alternately engage opposite ends of the flange 30. It should be noted that the disposition of the flange on the cam is such that its ends are at different distances from the center of rotation of the crank and that the lugs 31 and 32 are correspondingly positioned. By this arrangement, as soon as the saw reaches the end of its operative stroke the lug 31 engages one end of the flange 30 and actuates the cam to raise the frame, and at the end of the return stroke the lug 32 engages the other end of the flange and trips the cam, thereby lowering the frame. In the form shown in Figs. 1 and 2, the cam is arranged considerably above the crank shaft 10, and the lug 31 is therefore arranged upon an angularly disposed arm 16' on the crank, preferably integral therewith, in order to actuate the cam at the proper time.

It is obvious that if the member 24 remains stationary, the saw would cease to operate after a few strokes, as the slide-bar would drop into engagement with the portion 27 of the cam. It is therefore necessary to so arrange the thrust member 25 that the same will be lowered as the work progresses. To this end the thrust member is wedge shaped and supported upon an incline 25', and means are provided for lowering the thrust member on the incline as the work progresses. To this end a bell-crank lever 33 is pivotally mounted upon a bracket 34 and one arm thereof is connected at its lower end, by a link 35, with the thrust member 25. The end of the other arm of the bell-crank lever extends upwardly as at 36 and is engaged by a presser member 37 fixed to the member 8. By this construction the weight of the saw and its supporting frame will be brought to bear upon the arm 36 of the bell-crank lever, before the slide 8 engages the cam portion 27 thereby moving the thrust member 25 downwardly on the incline as the work progresses.

A spring 38 is connected at one end to the opposite end of the thrust member from the link 35 and the other end of the spring is connected as at 39 to a bracket 40 secured to the base. This spring tends to draw the thrust member upwardly on the incline when pressure on the bell-crank lever is relieved. It is obvious that when the weight of the saw and frame is supported on the cam face 28 the thrust of the member 24 on the thrust member 25 would tend to cause the latter to move downwardly on the incline. To obviate this, I form the coöperating surfaces of the thrust member and incline with a plurality of faces 41 perpendicular to the thrust of the cam, and connect these by inclined faces 42 which permit the spring 38 to perform its proper function. It is obvious that this stepped formation may be omitted without departing from the spirit of my invention and in some of the figures of the drawings I have illustrated the stepped formation and in others have shown the said surfaces as plain faces.

In Fig. 4 of the drawings I have illustrated a modification wherein the member 24 is dispensed with and the cam 23' is mounted upon ears 43 on the gear housing 6. In this construction the cam is arranged to act directly on the thrust member 25 instead of on the under face of the member 8. Otherwise the construction and operation of this form of the device is identical with that above described.

In Fig. 5 I have shown a still further modification. In this form of the device the cam acts directly on the thrust member as in the device shown in Fig. 4, and the presser-foot 37 is also dispensed with and replaced by an arm 37' projecting from the gear housing 6 and preferably formed integrally therewith and with the ears 43.

My invention also contemplates the provision of suitable means whereby when the frame is raised to any desired position it is there automatically maintained. To this end I project the cam shaft 26 forwardly from its support and equip the same with a handle 44, the weight of which normally tends to throw the cam portion 28 into operative position, that is into the position for maintaining the frame 3 in elevated position.

The device is preferably electrically driven and I have therefore illustrated the device as equipped with an electric motor, as above stated. When so equipped a switch 45 is provided having push buttons 46 and 47 for starting and stopping the motor respectively. As this switch may be of any desired form, and as such switches are common and well-known, detailed illustration and description of the same is omitted as being superfluous. It is obvious that the device may be manually started or stopped whenever desired by pressing the proper button. In order to automatically stop the device when desired I provide an arm or bracket 48 on the base 1 equipped with an adjustable member 49 which is adapted to be engaged by the button 47 when the saw reaches pre-determined position. Preferably the member 49 comprises a screw thread through the member 48 as shown.

The operation of the device is as follows:
The work 50 is arranged upon the work support 4 and held therein by any preferred means, such as a clamp (not shown). The handle 44 is then elevated to drop the cam, and the weight of the pivoted frame and saw is transmitted through the bell-crank 33 to lower the thrust member 25 and bring the saw into engagement with the work. The switch button 46 is then pressed to start the motor. At the end of the operative stroke the lug 31 on the crank engages the flange 30 throwing the cam portion 28 into operative position to raise the saw and maintain the same in raised position during the return stroke. At the end of the return stroke the lug 32 engages the opposite end of the flange 30 thereby tripping the cam and lowering the saw into engagement with the work. As there is a slight distance between the portion 27 of the cam and the element with which it coöperates, the saw frame is permitted a slight downward movement due to the progression of the saw through the work. Before the cam portion 27 becomes engaged by its adjacent part the presser-foot engages the bell-crank lever and withdraws the thrust member 25 a slight distance thereby maintaining the proper space between the cam and its coöperating element. As the saw continues the work the pivoted frame therefore swings downwardly and in doing so brings the switch button 47 into engagement with the member 49 thereby operating the frame to stop the motor. As the member 49 is adjustable it is obvious that the motor may be stopped automatically at any pre-determined position of the saw with relation to the work.

Should it be found desirable, at any time, to raise the saw manually, the same will be maintained in the raised position as long as desired without any attention on the part of the operator. Upon raising the frame the bell-crank lever 33 and the thrust member 25 are relieved of all weight, whereupon the spring 38 draws the thrust member upwardly until it is in normal position with relation to the cam. The handle 44 at this time has, through gravity, actuated the cam to bring the portion 28 into operative position, so that when the saw is released after having been manually raised, it is supported with the presser-foot 37, or the corresponding portion 37', out of engagement with the bell-crank lever. To lower the saw it is but necessary to raise the handle 44 which drops the cam so as to allow the presser member to engage the bell-crank lever which in turn withdraws the thrust member through the weight of the frame and saw to bring the latter into engagement with the work.

I claim:

1. In a hack saw, a base, a frame pivotally mounted on said base, a saw mounted for reciprocation on said frame, means for reciprocating said saw, an oscillatory cam interposed between said frame and said base, and means for oscillating said cam to lower the saw for each work stroke and for raising the same for each return stroke, substantially as described.

2. In a hack saw, a base, a frame pivotally mounted on said base, a saw mounted for reciprocation on said frame, rotary means for reciprocating said saw, an oscillatory cam interposed between said frame and said base, and means on said rotary means for oscillating said cam to lower the saw for each work stroke and to raise the same for each return stroke, substantially as described.

3. In a hack saw, a base, a frame pivotally mounted on said base, a saw mounted for reciprocation on said frame, means for reciprocating said saw, and means governed by the cut of the saw for feeding the saw to the work, substantially as described.

4. In a hack saw, a base, a frame pivotally mounted thereon, a saw mounted for reciprocation on said frame, means for reciprocating said saw, means for raising the said saw upon each return stroke, and means governed by the cut of the saw for automatically feeding the saw to the work, substantially as described.

5. In a hack saw, a base, a frame pivotally mounted on said base, a saw mounted for reciprocation on said frame, means for reciprocating said saw, a thrust member mounted on said base, a cam interposed between the said thrust member and said frame, means for actuating said cam to raise the saw upon each return stroke, and means governed by the cut of the saw for lowering said thrust member, substantially as described.

6. In a hack saw, a base, a frame pivotally mounted thereon, a saw mounted for reciprocation on said base, a cam, means for actuating said cam to raise the saw upon the return stroke thereof, and means for automatically actuating said cam into position to maintain the frame in raised position when said frame is raised manually, substantially as described.

7. In a hack saw, a base, a frame pivotally mounted thereon, a saw mounted for reciprocation on said frame, means for reciprocating said saw, an incline on said base, a thrust member slidably mounted on said incline a cam interposed between said frame and said thrust member, means for actuating said cam to raise said frame upon each return stroke of the saw, the coöperating faces of said incline and said thrust member being provided with a plurality of faces substantially perpendicular to the thrust of the cam and means governed by the feed of the saw for moving said thrust member on said incline, substantially as described.

8. In a hack saw, a base, a frame pivotally mounted on a horizontal axis thereon, a saw mounted for reciprocation on said frame, means including a motor on said frame for reciprocating said saw, a switch on said frame for controlling the circuit of said motor and a fixed member on said base adapted to be engaged by said switch upon the downward movement of said frame for throwing said switch automatically to stop the motor when the saw has reached a pre-determined position, substantially as described.

9. In a hack saw, a base, a frame pivotally mounted thereon, and comprising a gear housing and slide-bar, a saw mounted for reciprocation on said slide-bar, a transverse motor driven shaft in said housing and projecting beyond the side thereof, a crank on said shaft, a cam interposed between said frame and said base for raising the saw upon the return stroke thereof, means on the inner face of said crank for actuating said cam, a wrist-pin on the outer face of said crank, a pitman and universal joints between said pitman and said wrist-pin and saw respectively, substantially as described.

10. In a hack saw, a base, a frame pivotally mounted on a horizontal axis thereon and provided with a motor base, a motor thereon, a saw mounted for reciprocation on said frame and means connecting said motor and said saw for actuating the latter, substantially as described.

11. In a hack saw, a base, a frame pivotally mounted on a horizontal axis thereon, a motor base on said frame, a saw mounted for reciprocation on said frame, means connecting said motor and said saw for actuating the latter and means operated by the downward swing of said frame for automatically stopping said motor when the saw has reached a pre-determined position, substantially as described.

12. In a hack saw, a base, a frame pivotally mounted on a horizontal axis thereon, a saw mounted for reciprocation on said frame, means including a motor on the said frame for reciprocating said saw, a switch on said frame for controlling the circuit of said motor, a fixed member on said base and an adjustable member on said fixed member adapted to be engaged by said switch upon the downward movement of said frame for throwing said switch automatically to stop the motor when the saw has reached a predetermined position.

In testimony whereof I have signed my name to this specification in the presence of two subscribing witnesses.

FRANK J. MILLER.

Witnesses:
L. BERYL JACKSON,
DON W. LARRABEE.